United States Patent [19]
Otsuka et al.

[11] Patent Number: 5,671,962
[45] Date of Patent: Sep. 30, 1997

[54] BIFINGER HAND FOR AN INDUSTRIAL ROBOT AND A METHOD OF CONTROLLING THE OPERATION OF THE BIFINGER HAND

[75] Inventors: Kazuhisa Otsuka; Akira Tanaka, both of Minamitsuru-gun, Japan

[73] Assignee: Fanuc Ltd., Yamanashi, Japan

[21] Appl. No.: 517,850

[22] Filed: Aug. 22, 1995

[30] Foreign Application Priority Data

Sep. 22, 1994 [JP] Japan ................................ 6-227988

[51] Int. Cl.$^6$ ...................................................... B25J 9/16
[52] U.S. Cl. ........................ 294/119.1; 294/907; 901/32; 901/46
[58] Field of Search ............................. 294/119.1, 907, 294/86.4, 67.33; 901/32–38, 46, 47

[56] References Cited

U.S. PATENT DOCUMENTS

| | | | |
|---|---|---|---|
| 3,815,761 | 6/1974 | Adam | 901/32 |
| 4,579,380 | 4/1986 | Zaremsky et al. | 901/46 |
| 4,600,357 | 7/1986 | Coules | 294/907 |
| 4,696,501 | 9/1987 | Webb | 901/32 |
| 4,797,564 | 1/1989 | Ramunas | 901/46 |
| 4,848,546 | 7/1989 | McCormick et al. | 901/46 |
| 4,852,928 | 8/1989 | Monforte | 294/119.1 |
| 4,872,803 | 10/1989 | Asakawa | 901/34 |
| 4,915,574 | 4/1990 | Park et al. | 901/46 |

Primary Examiner—Dean Kramer
Attorney, Agent, or Firm—Nikaido Marmelstein Murray & Oram LLP

[57] ABSTRACT

A robot hand is provided with a bifinger unit integrally including a pair of fingers for grasping a workpiece therebetween, a finger feed unit for moving the pair of fingers between a predetermined open position and a closed grasping position, a single servomotor driving the feed mechanism to thereby move the pair of fingers so that a constant predetermined holding force is applied to the workpiece from the pair of fingers during the grasping operation of the fingers of the bifinger unit of the robot hand irrespective of the weight, the size, the shape or the surface condition of the workpiece.

10 Claims, 3 Drawing Sheets

BIFINGER HAND FOR AN INDUSTRIAL ROBOT AND A METHOD OF CONTROLLING THE OPERATION OF THE BIFINGER HAND

BACKGROUND OF THE INVENTION

1. Field of the Invention

The present invention relates generally to a hand of an industrial robot, and more particularly, relates to a bifinger hand of an industrial robot in which two parallel fingers of the hand are provided so that they are moved toward and away from each other via the operation of a feed screw mechanism driven and controlled by a servomotor, to thereby hold and release workpieces of different sizes by a predetermined optimum force. The present invention also relates to a method of controlling the operation of the bifinger hand of the industrial robot.

2. Description of the Related Art

Industrial palletizing robots are widely used for the handling of many types of workpieces such as unused or used cartons, various bags, printed matters, and rice sacks. The handling of workpieces includes conveying of the workpieces from a first position to a separate second position, and replacing the workpieces by turning. The above-mentioned palletizing robot is constructed as a multi-articulated horizontal type industrial robot provided with a plurality of articulations about which movable elements of the robot such as a robot wrist, at least one robot hand, and a robot body can be turned to perform required robot motions. Namely, the palletizing robot is provided with a robot hand movably attached to the end of a robot wrist to hold or grasp a workpiece. Therefore, for example, when workpieces such as many cartons piled onto a pallet are to be conveyed from the position on the pallet to a different position, each of the workpieces is held and picked up by the robot hand of the palletizing robot and conveyed from the position on the pallet to a different position where the workpiece is unloaded. The hand of the palletizing robot is provided with a bifinger unit comprised of a pair of parallel fingers, each having the shape of a flat plate. The bifinger unit is used for grasping each workpiece, e.g., a carton by sandwiching the workpiece between the pair of parallel fingers. When grasping the workpiece by the bifinger unit of the palletizing robot, the fingers are moved toward each other to sandwich the workpiece therebetween, and the fingers are moved away from each other to release and unload the workpiece at a predetermined position.

When the bifinger unit of the palletizing robot repeatedly holds and conveys identical workpieces, it is required that the fingers constantly hold the workpieces with a predetermined optimum grasping force to thereby prevent the workpieces from being either dropped or damaged. The movement of the bifinger unit of the palletizing robot, according to the prior art for opening and closing by the operation of a feed-screw mechanism, is to close and open the opening therebetween, and the feed-screw mechanism is driven and controlled by a servomotor. In operation, the opening and closing movement of the pair of parallel fingers driven by the servomotor is beforehand registered in a robot controller as taught data, and the actual operation of the fingers for grasping and conveying workpieces is carried out in a playback manner in accordance with the registered taught data.

Nevertheless, when the robot hand provided with a bifinger unit is operated in playback manner, the movement of the pair of flat-plate like fingers of the bifinger unit to open and close the fingers is always stopped at positions instructed by the teaching data. Thus, when the size of a workpiece held by the bifinger unit deviates from a predetermined dimensional allowance, the workpiece might be held by the bifinger unit at a force different from an optimum present force. Namely, when the size of a workpiece is larger than the value included in the teaching data, the fingers of the bifinger unit will be moved by the servomotor to a position where a force larger than the optimum force is applied to the workpiece when grasping the workpiece. On the other hand, when the size of a workpieces is smaller than the value included in the teaching data, the fingers of the bifinger unit cannot be moved by the servomotor to a position suitable for exhibiting a sufficient force for accurately grasping the workpiece. In order to eliminate these inconveniences of the conventional bifinger unit, the unit is always provided with an additional pneumatic cylinder. Namely, the conventional bifinger unit is constructed such that the fingers thereof are initially moved by the servomotor toward each other until the fingers reach a predetermined first closing position and subsequently, the fingers are gradually moved by the pneumatic cylinder toward each other until the fingers reach a final position suitable for appropriately grasping each workpiece by a constant grasping force, in response to a change in the size of the workpieces.

Nevertheless, a provision of the pneumatic cylinder on the bifinger unit increases the weight of the unit to be attached to the end of a robot wrist of the industrial robot, and accordingly, an additional load is applied to drive motors mounted at the articulations of the robot such as the articulations of the robot arm of the industrial robot. Accordingly, the bifinger hand is unable to hold or grasp a workpiece which has a weight greater than a predetermined upper limit value.

If the output of the servomotor is increased, the manufacturing cost of the robot hand provided with the bifinger unit will also increase. Moreover, the provision of both the servomotor and the pneumatic cylinder on the robot hand requires an additional maintenance operation to keep the operation of the robot hand constant. Further, an increase in the number of parts of the robot hand attributes to an increase in occurrence of malfunctions of the robot hand. Thus, it is requested to provide a robot hand provided with a bifinger unit improved over the above-mentioned conventional robot hand.

Further, a robot hand provided with a bifinger unit having a pair of opening and closing fingers driven by only pneumatic cylinders has been proposed. Nevertheless, when the fingers are moved by only the pneumatic cylinders, the extent of the movement of the fingers must be manually adjusted in response to a change in the size of workpieces to be held by the hand in order to comply with the limited stroke of the pneumatic cylinders. This is cumbersome from the viewpoint of achieving a high operation efficiency of the industrial robot.

SUMMARY OF THE INVENTION

Therefore, an object of the present invention is to provide a robot hand provided with a bifinger unit having a pair of parallel fingers, and adapted for being attached to an end of a robot wrist of a multi-articulated horizontal type industrial robot.

Another object of the present invasion is to provide a robot hand provided with a bifinger unit having a pair of mutually movable parallel fingers and a servomotor as a drive source for moving the fingers.

In accordance with one aspect of the present invention, there is provided a robot hand provided with a bifinger unit having a pair of relatively movable fingers for grasping a workpiece therebetween comprising:

a palm means formed as a base portion of said robot hand;

a pair of finger-support means for removably supporting the pair of fingers, the finger-support means being movably mounted on the palm means;

a finger feed means mounted on the palm means for providing the pair of finger support means with a feed motion along a predetermined axis to thereby relatively move the pair of fingers between a grasping position thereof and a predetermined releasing position thereof distant from the grasping position;

a single servomotor means mounted on the palm means of said robot hand for driving the finger feed means; and a unit for controlling an operation of the servomotor to thereby adjust the grasping position of the pair of fingers so that a predetermined optimum holding force is applied to the workpiece irrespective of a change in weight, size, shape, hardness, and surface condition of the workpiece.

In accordance with another aspect of the present invention, there is provided a method of controlling the operation of a robot hand provided with a bifinger unit having a pair of grasping fingers movable between a relatively closed position for grasping a workpiece and an open position for releasing the workpiece, a feed mechanism for providing the pair of fingers of the bifinger unit with a feed motion, and a servomotor for driving the feed mechanism, the method being characterized by comprising the steps of:

determining beforehand the data of the holding forces applied to various workpieces by the pair of fingers of the bifinger unit depending on weight, shape, and surface condition of each of the various workpieces, and storing the data of the holding forces in a memory means;

selecting a desired holding force necessary for grasping an actual workpiece from the data of holding forces stored in the memory means;

determining an optimum output torque from an overall range of torque which can be exerted by the servomotor, in accordance with the desired holding force necessary for grasping the actual workpiece;

controlling the operation of the servomotor so that the optimum output torque is derived from the servomotor; and terminating the grasping of the actual workpiece by the pair of fingers when an output torque exerted by the servomotor reaches the optimum output torque during grasping operation of the bifinger unit of the robot hand.

In accordance with the above-described robot hand provided with the bifinger unit having the pair of fingers, the pair of fingers can operate so as to gradually increase the holding force applied to the actual workpiece until the output torque of the servomotor reaches the set torque value, and accordingly, the holding force can be constantly the optimum holding force, irrespective of difference in the weight, the shape and the surface condition of the workpiece. Thus, the robot hand can stably and accurately grasp the workpiece with an optimum holding force. The robot hand employs neither hydraulic nor pneumatic cylinder during final stage of grasping operation of the bifinger unit. Therefore, the robot hand can be light in weight and can have a reduced manufacturing cost. Further, since few parts are necessary for producing the robot hand this contributes to a reduction in the manufacturing cost and in the malfunction of the robot hand. Thus, the operation reliability of the robot hand provided with a bifinger unit having a pair of fingers can be increased.

Moreover, the robot hand of according to the present invention can grasp and transfer many different workpieces at the site of handling the workpieces only by simply exchanging the pair of fingers in response to a change in the size of the workpieces. Namely, no cumbersome adjusting operation is needed, at the site of handling the workpieces, for an industrial robot using the robot hand.

BRIEF DESCRIPTION OF THE DRAWINGS

The above and other objects, features, and advantages of the present invention will be made more apparent from the ensuing description of a preferred embodiment in conjunction with the accompanying drawings wherein.

DESCRIPTION OF THE PREFERRED EMBODIMENT

Figure 1:
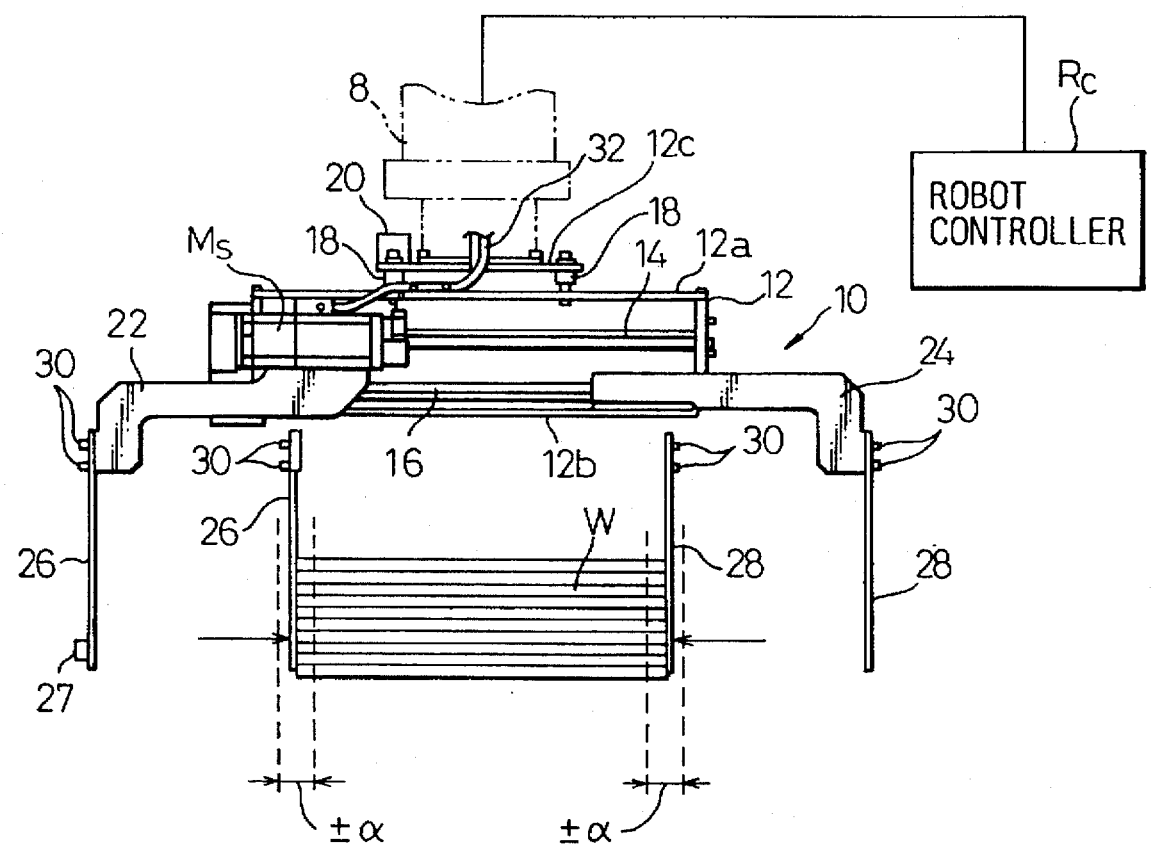
FIG. 1 is a front view of a robot hand provided with a bifinger unit having a pair of fingers according to an embodiment of the present invention.

Referring to FIG. 1, a bifinger type robot hand 10 according to the embodiment of the present invention is provided with a palm portion 12 formed as a base member thereof and a bifinger unit described later. The palm portion 12 includes an upper beam 12a, a lower beam 12b connected together by two unnumbered side members, and two parallel feed screw shafts 14 and 16 held between two unnumbered side members so as to be rotated about their own axis of rotation which extends in parallel with the upper and lower beams 12a and 12b. The feed screw shafts 14 and 16 are housed in a region defined by the upper and lower beams 12a and 12b and the side members.

The upper beam 12a of the palm portion 12 is provided with a connecting flange member 12c mounted thereon, which allows the robot hand 10 to be removably attached to a robot wrist 8 of an industrial robot. The connecting flange 12c is located at approximately the center of the upper beam 12a via a plurality of floating mechanisms 18 which are provided between the connecting flange 12c and the upper beam 12a to prevent the robot wrist 8 from being broken by an excessive physical shock which is directly transmitted from the robot hand 10 when an unexpected large load is applied to the robot hand 10. When the floating mechanisms 18 are operated, the mechanical connection between the connecting flange 12c and the upper beam 12a is broken to operate a breakage-detection sensor 20. The detection signal is transmitted to a robot controller Rc.

The bifinger unit of the robot hand 10 includes a pair of lateral finger-supports 22 and 24 which are used to grasp a workpiece therebetween. One of the finger-supports, i.e., the left-hand finger-support 22 is provided with a female screw portion (not shown) formed therein and threadedly engaged with one of the above-mentioned feed screw shafts 14 and 16, i.e., the screw shaft 14 so that the finger-support may linearly laterally move back and forth in response to rotation of the screw shaft 14. Similarly, the right-hand finger-support 24 is provided with a female screw portion formed therein and threadedly engaged with the other feed screw shaft 16 so that the finger-support 24 may be laterally moved back and forth in response to the rotation of the screw shaft 16.

The finger-supports 22 and 24 have an outer mounting end, respectively, to mount thereon fingers 26 and 28 as shown in FIG. 1. The fingers 26 and 28 are fixedly but removably attached to the mounting ends of the finger-supports 22 and 24 by appropriate fixing means such as male screws 30. The fingers 26 and 28 are preferably made of a pair of parallel flat-plate members when they are used for grasping a parallelpiped workpiece "W" such as a stack of folded cartons. The pair of fingers 26 and 28 made of the pair of parallel flat-plate members can grasp the parallelpiped workpiece "W" therebetween when they are moved towards each other in response to a mutual approach of the finger-supports 22 and 24, in order to carry the workpiece "W" from a given place to a different place.

The fingers 26 and 28 may take various forms such as a pair of hooked fingers having, at extreme ends thereof, a jaw or a claw suitable for preventing the workpiece "W" from slipping off from the fingers when the workpiece "W" is e.g., a rice sack filled with rice.

Figure 2:
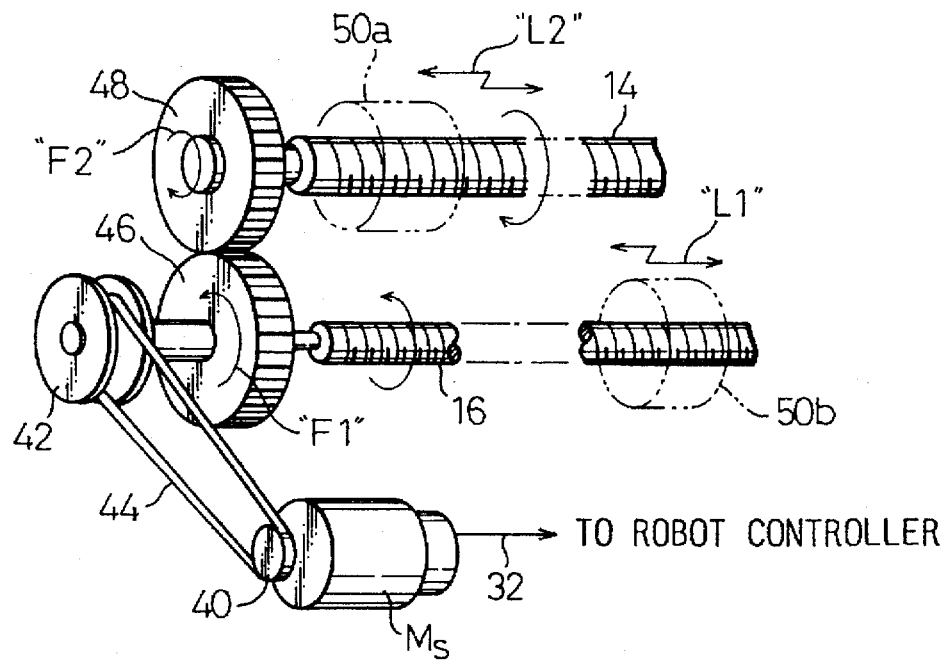
FIG. 2 is a schematic perspective view of a finger feed mechanism driven by a servomotor and accommodated in the bifinger unit as shown in FIG. 1.

The pair of fingers 26 and 28 release the workpiece "W" when they are moved away from one another in response to separation of the finger-supports 22 and 24. FIG. 1 illustrates two cases wherein the fingers 26 and 28 are moved apart from one another, and wherein the two fingers 26 and 28 mutually approach so as to grasp a stack of plate-like workpieces "W". FIG. 2 also illustrates that when the size of the workpieces "W" changes within an allowance ±α, the pair of fingers 26 and 28 can automatically move to a position where they grasp the workpieces "W" at a constant holding force in the manner described later.

It should be understood that the movement of the pair of fingers 26 and 28 approaching each other for grasping the workpiece "W" and separating from each other for releasing the workpiece is caused by the rotation of the feed screws shafts 14 and 16 which is driven by a servomotor Ms mounted on the palm 12 of the robot hand. The servomotor Ms is supplied with electric power and electric control signals through cables 32 which run from the robot controller Rc to the servomotor Ms directly or through the body of the robot.

Referring now to FIG. 2 the feed mechanism of the bifinger unit, in which the feed screw shafts 14 and 16 are rotationally driven by the servomotor Ms via a belt-pulley mechanism and a pair of engaging gears, is shown. Namely, a drive pulley 40, mounted on the output shaft of the servomotor Ms electrically connected to the robot controller Rc, transmits rotation from the servomotor Ms to a driven pulley 42 attached to one of the feed screw shafts 14 and 16, i.e., to the feed screw shaft 16, via a drive belt 44. Thus, the feed screw shaft 16 is rotated about its own axis in a direction shown by an arrow "F1". The rotation of the feed screw shaft 16 is in turn transmitted to the feed screw shaft 14 via an engagement of a pair of drive and driven gears 46 and 48 mounted on the feed screw shafts 14 and 16, respectively. The feed screw shaft 14 is thus rotated in a direction shown by an arrow F2" which is reverse to the rotating direction of the feed screw shaft 16. The rotation of the feed screw shafts 14 and 16 in two different directions "F1" and "F2" causes nut members 50a and 50b having female screw threads therein engaging the feed screws 14 and 16 to linearly and synchronously move in directions "L1" and "L2". Since the nut members 50a and 50b are integrally accommodated in respective ends of the aforementioned finger-supports 22 and 24, the synchronous linear movement of the nut members 50a and 50b can move the finger-supports 22 and 24 in the described manner.

The servomotor Ms is provided with a rotation detector such as an electric encoder device, and therefore, the rotation of the servomotor Ms, and accordingly, the rotation of the feed screw shafts 14 and 16 is detected by the rotation detector and the corresponding signals are transmitted to the robot controller Rc via the cables 32. Simultaneously, control signals are supplied from the robot controller Rc to the servomotor Ms via the cables 32, to control the rotation thereof.

As shown in FIG. 1, the robot controller Rc is further electrically connected, via appropriate cables, to a detector 20 for detecting the operation of the floating mechanisms 18, and to a work-detector 27 attached to one of the pair of fingers 22 and 24, e.g., the finger 26 for detecting an existence of a workpiece "W" between the fingers 26 and 28 of the bifinger unit.

It should be understood that the construction and arrangement of the feed screw mechanism shown in FIG. 2 is a preferred embodiment, but is not limited thereto. Thus, it is possible to make various modifications to the feed mechanism of FIG. 2. For example, the feed screw shafts 14 and 16 are preferably consisting of ball-screw type feed screw shafts, and accordingly, the nut members 50a and 50b integral with the finger-supports 22 and 24 consist of ball-incorporated-nut-elements. Further, the shown pair of drive and driven gears 46 and 48 consisting of a pair of spur gears may be modified so as to consist of a different rotation transmitting mechanism. For example, when one of the feed screw shafts 14 and 16, e.g., the feed screw shaft 16 is formed to have reverse screw threads, and when the two feed screws are synchronously driven by the servomotor Ms via a pair of belt and pulley mechanisms, the nut members 50a and 50b can be linearly synchronously moved toward and away from each other without an arrangement of any gear engaging mechanism.

Figure 3:
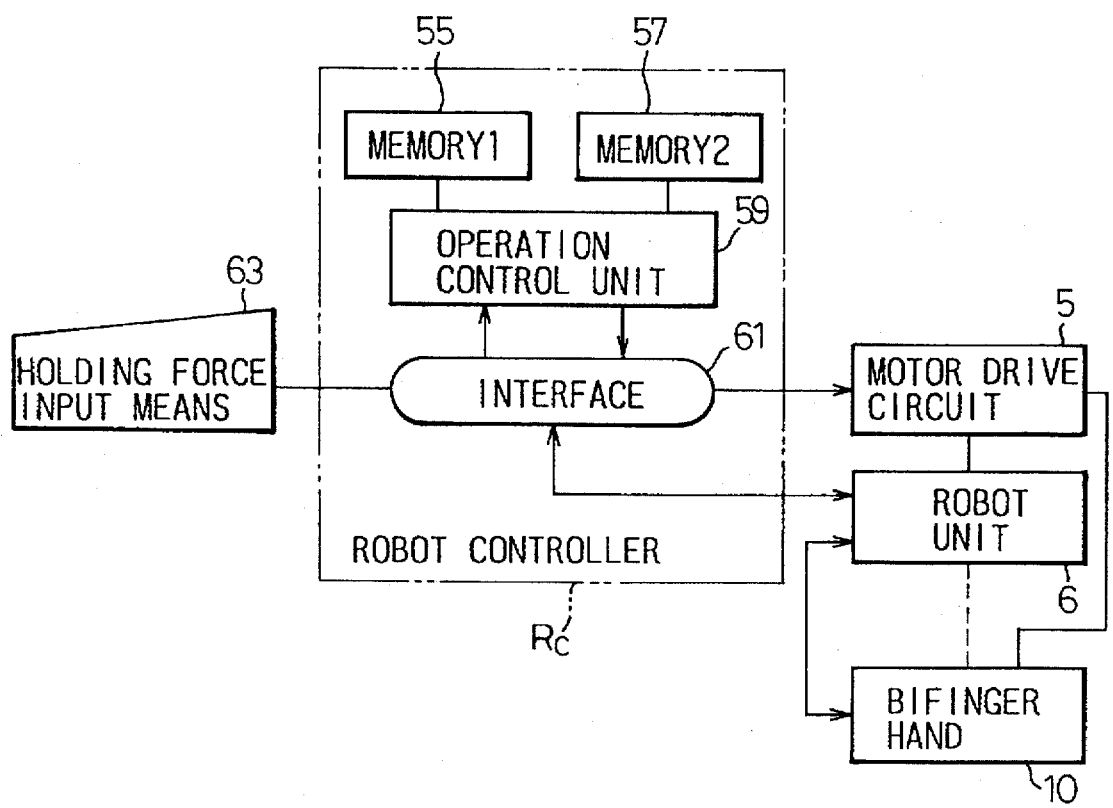
FIG. 3 is a block diagram of a control system for controlling the robot hand provided with the bifinger unit as shown in FIG. 1; and, FIG. 4 is a flow-chart of the controlling operation of the robot hand provided with the bifinger unit according to the present invention.

Referring to FIG. 3, an overall control arrangement of the above-mentioned robot controller Rc, a robot unit 6 including the wrist 8, and the robot hand 10 including a bifinger unit having the pair of fingers 26 and 28 is shown.

As will be understood from the arrangement of FIG. 3, the robot controller Rc includes a first memory means 55 (memory 1) for beforehand storing basic data containing control programs for controlling the operation of the robot unit 6 and the robot hand 10, various basic operation equations, a later-described output torque-to-holding force table with respect to the servomotor Ms, a second memory means 57 (memory 2) for erasably storing data such various command data, an operation control unit 59 consisting of a known CPU, and an interface unit 61 for providing an interconnection between the operation control unit 59 of the robot controller Rc and the robot unit 6, the robot hand 10, a motor drive circuit 5, and a holding force input means 63. The interface unit 61 permits the operation control unit 59 to deliver various control signals to the motor drive circuit 5, the robot unit 6, and the robot hand 10, and to receive diverse signals such as the afore-mentioned various detection signals from the robot unit 6 and the robot hand 10. The interface unit 61 also permits the holding force input means 63 to manually input holding force data such as weight and outer surface condition of a workpiece, with respect to different kinds of workpieces "W", to the second memory 57 via the operation control unit 59.

The motor drive circuit 5 is provided for commonly supplying controlled drive power to non-illustrated respective drive motors consisting of servomotors mounted on the robot unit 6, and to the afore-mentioned servomotor mounted on the robot hand 10 for driving the bifinger unit thereof.

The operation of the robot hand 10 provided with the bifinger unit having a pair of fingers 26 and 28 will be described below.

Initially, an operator inputs holding force data such as weight, hardness, and surface roughness or smoothness of objective workpieces "W" to be grasped by the pair of fingers 26 and 28 of the robot hand 10 from the holding force input means 63 into the robot controller Rc, i.e., into the second memory 57.

Then, the robot controller Rc calculates an optimum holding force with respect to the objective workpieces "W" on the basis of the input holding force data stored in the second memory 57 via the interface unit 61 and the operation program beforehand stored in the first memory 55 which includes predetermined arithmetic equations to obtain a functional relationship between a given holding force data and an actual force to be exerted by the pair of fingers 26 and 28 when grasping the workpiece "W". Subsequently, the robot controller Rc further calculates an output data of the servomotor Ms necessary for grasping of the objective workpieces by the pair of fingers 26 and 28 of the bifinger unit with the calculated optimum holding force. Namely, the operation control unit 59 obtains the output torque of the servomotor Ms, for permitting the pair of fingers 26 and 28 to grasp the objective each workpiece "W" with the calculated optimum holding force, from the reference table indicating the torque-to-holding force relationship stored in the first memory 55. Further, the operation control unit 59 delivers motor data including drive power data for permitting the servomotor Ms to exhibit the above-obtained output torque to the motor drive circuit 5.

Therefore, the robot hand 10 provided with a bifinger unit having the pair of fingers 26 and 28 is brought to the site of grasping the objective workpieces "W" by the programmed movement of the robot unit 6, and can grasp one of the workpieces "W" with the calculated optimum holding force. The grasping of each of the objective workpieces "W" carried out, by the bifinger unit of the present invention, with the optimum holding force is constantly repeated under the calculated output torque of the servomotor Ms.

When each workpiece "W" grasped by the robot hand 10 is transferred by the robot unit 6 to a predetermined position where it is released from the bifinger unit of the robot hand 10, the servomotor is driven to move the pair of fingers 26 and 28 away from each other to thereby permit the workpiece "W" to be released therefrom. Since the rotation of the servomotor Ms is constantly monitored by the rotation detector of the servomotor Ms, when the rotation detector detects that the number of rotation of the servomotor Ms arrives at a certain number required for separating the pair of fingers 26 and 28 from one another and establishing a predetermined wide open position thereof, a signal is transmitted from the rotation detector to the robot controller Rc. Thus, the robot controller Rc controls the stopping of the servomotor Ms at the predetermined open position thereof. Namely, the pair of fingers 26 and 28 are stopped at a predetermined position where the fingers are wide open, and this predetermined position of the fingers 26 and 28 should preferably be stored in the second memory 57 of the robot controller Rc as a "home position" of the pair of fingers 26 and 28 of the bifinger unit of the robot hand 10.

Nevertheless, the home position of the fingers 26 and 28 stored in the second memory 57 may be changed in response to a change in the size and sort of a workpiece "W" by utilizing the signal of the rotation detector of the servomotor Ms.

The robot controller Rc receives a signal from the work-detector 27 attached to the finger 26. The signal of the work-detector 27 indicates whether or not a workpiece "W" exists between the pair of fingers 26 and 27 of the bifinger unit of the robot hand 10. Therefore, the robot controller Rc can control a start of grasping of a workpiece "W" by the bifinger unit of the robot hand 10 according to the signal of the work-detector 27. The signal of the work-detector 27 can also permit the robot controller Rc to judge whether or not the robot hand 10 provided with the bifinger unit arrives at a correct position to appropriately grasping the workpieces "W". The signal of the work-detector 27 can further permit the robot controller Rc to judge whether or not the workpieces "W" are located at a predetermined position suitable for being grasped by the bifinger unit of the robot hand 10. Thus, it is ensured that the bifinger unit of the robot hand 10 can surely and accurately grasp the workpieces.

As described before, when any excessive load is applied to the robot hand 10 during the workpiece grasping and conveying operation thereof, the floating mechanisms 18 arranged between the upper beam 12a of the palm portion 12 and the connecting flange 12c are positively broken to destroy the mechanical connection between the connecting flange 12c and the upper beam 12a, so that the excessive load is not transmitted to the wrist 8 of the robot unit 6. Namely, the robot unit 6 including the wrist 8 and other movable elements thereof can be protected from being broken by an externally applied load or force. The breakage of the floating mechanisms 18 is immediately detected by the breakage-detection sensor 20, and the detection signal is transmitted to the robot controller Rc to thereby make the controller Rc aware of the breakage of the floating mechanisms 18.

Typically, each of the floating mechanisms 18 consists of a combination of a conventional linear guide element mounted on the connecting flange 12c of the palm portion 12 and an upright shaft arranged so as to extend from the upper beam 12a of the palm portion 12 into the linear guide element. Thus, when an external excess force or load is applied to anyone of the floating mechanisms 18 via the bifinger unit of the robot hand 10, the upright shaft of the floating mechanism 18 is immediately moved far into the guide element to thereby actuate a switching means contained in the breakage-detection sensor 20. Thus, a signal indicating the operation of the floating mechanism 18 is transmitted to the robot controller Rc. Then, the robot controller Rc can stop the operation of the robot unit 6 and the grasping operation of the robot hand 10.

Figure 4:
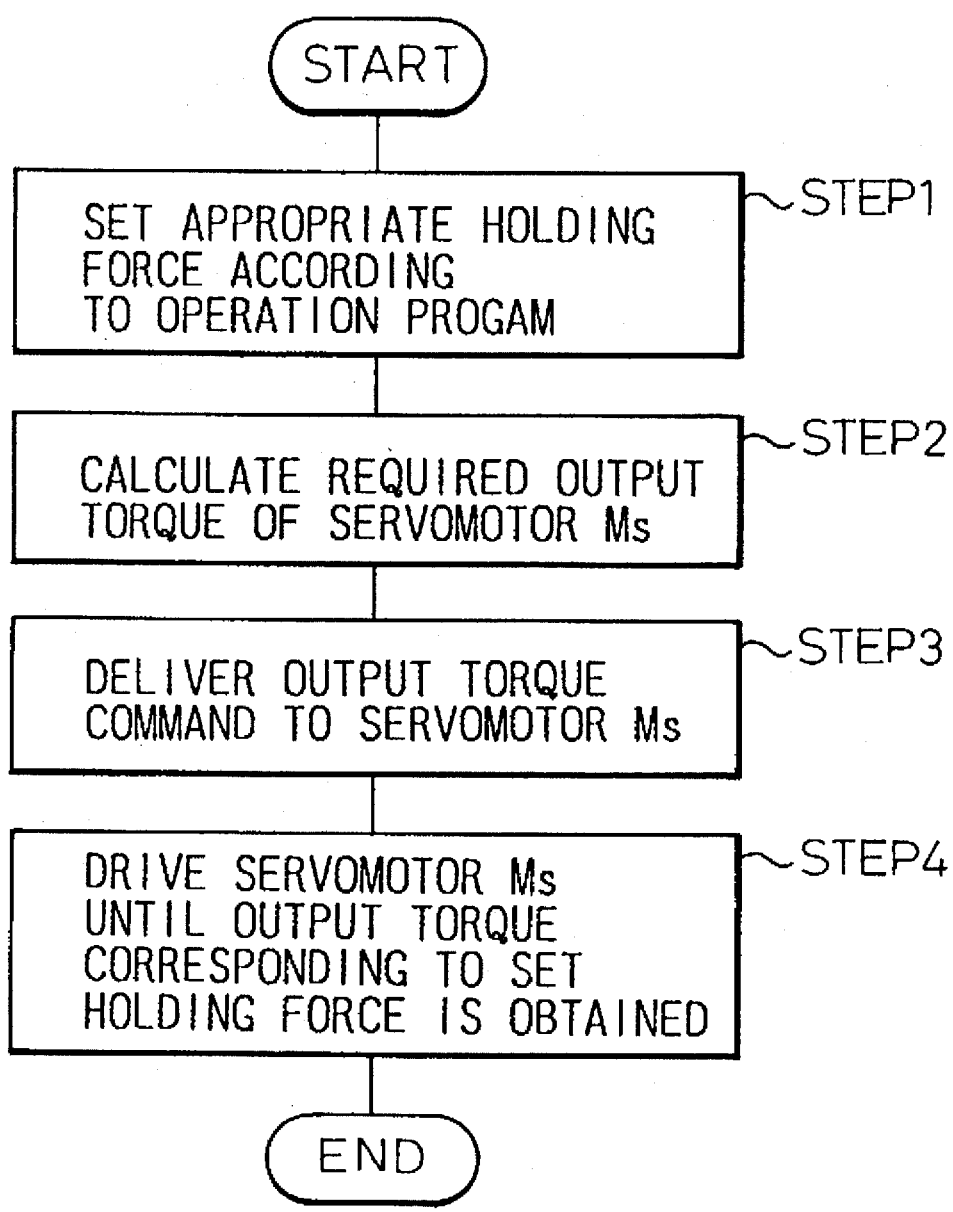

The flow chart of FIG. 4 illustrates the above-described operation of the robot controller Rc.

Referring to FIGS. 3 and 4, the operation control unit 59 of the robot controller Rc computes an optimum holding force for grasping an objective workpiece "W" according to the operation program stored in the first memory 55 and the holding force data input by the holding force input means 63 and stored in the erasable second memory 57 (the first step). Subsequently, the operation control unit 59 calculates an output torque of the servomotor Ms necessary for obtaining the computed optimum holding force on the basis of the reference tables stored in the first memory 55 indicating the relationship between the holding force to be exhibited by the bifinger unit of the robot hand 10 and the output torque exerted by the servomotor Ms (step 2). The operation control unit 59 further delivers a command signal to the motor drive circuit 5 via the interface unit 61, so that the motor drive circuit 5 supplies the servomotor Ms of the robot hand 10 with an electric power permitting the servomotor Ms to exert the calculated output torque at the output end thereof (step 3). Accordingly, the servomotor Ms is operated so as to drive the robot hand 10. Namely, the bifinger unit of the robot hand 10 starts the movement thereof to grasp a workpiece "W" until the workpiece "W" is grasped by the pair of fingers 26 and 28 of the bifinger unit by the afore-calculated optimum holding force. The operation of the servomotor Ms and the pair of fingers 26 and 28 continues until the fingers 26 and 28 applies the optimum holding force to the workpiece "W". When the holding force of the pair of fingers 26 and 28 attains the optimum holding force, the servomotor Ms is stopped, and the grasping of the workpiece "W" carried out by the fingers 26 and 28 of the bifinger unit of the robot hand 10 is completed (step 4).

According to the above-described operation of the robot hand 10 controlled by the robot controller Rc, it should be appreciated that the workpieces "W" can be grasped by a constant holding force irrespective of a difference in the size of respective workpieces "W".

From the foregoing description of the preferred embodiment of the present invention, it will be understood that the robot hand provided with a bifinger unit having a pair of fingers according to the present invention is driven by a single servomotor, and is able to constantly exhibit a predetermined optimum holding force when grasping workpieces without causing a damage to the workpieces, irrespective of a change in the size, the shape, the surface roughness or smoothness, and the hardness of the respective workpieces. Thus, when the robot unit transfers each of the workpieces grasped by the bifinger unit of the robot hand from a given position to a different position, the bifinger unit does not drop the workpiece on the way.

Moreover, according to the present invention, an appropriate grasping of a workpiece by the bifinger is achieved by controlling the operation of the single servomotor. Namely, no cumbersome adjustment of the position of the fingers, which is needed by the conventional robot hand employing the pneumatic cylinders to comply with a change in the size and the shape of workpieces can be completely eliminated. Therefore, the operation efficiency of the grasping and conveying of workpieces can be greatly increased.

Further, the use of a single servomotor can contribute to a reduction in the number of parts of the robot hand and accordingly, to a reduction in the manufacturing cost of the workpiece grasping robot hand. The operation reliability of the robot hand provided with a bifinger unit can be high.

The provision of the floating mechanism and the work-detector means for the bifinger unit of the robot hand enhances a function of preventing the robot hand and the robot unit from being damaged, and prevents malfunction of the robot hand during grasping of a large number of workpieces.

It should be understood that many modifications and variations will occur to persons skilled in the art without departing the scope and spirit of the invention as claimed in the accompanying claims.

What we claim:

1. A robot hand provided with a bifinger unit, having a pair of relatively movable fingers for grasping a workpiece therebetween, comprising:
    a palm means formed as a base portion of said robot hand;
    a pair of finger-support means for removably supporting the pair of fingers, said finger support means being movable mounted on said palm means;
    finger feed means mounted on said palm means for providing said pair of finger-support means with a feed motion along a predetermined axis to therein relatively move said pair of fingers between a grasping position thereof and a predetermined releasing position thereof distant from said grasping position;
    a single servomotor means mounted on the palm means of said robot hand for driving the finger feed means; and
    control means for controlling an operation of said servomotor to therein adjust said grasping position of said pair of fingers so that a predetermined optimum holding force is applied to the workpiece based upon weight, size, shape, hardness, and surface condition of the workpiece, wherein said control means is connected to a holding force input means by which holding force data, necessary for determining said predetermined optimum holding force of the workpiece, is input into said control means.

2. A robot hand according to claim 1, wherein said pair of fingers comprises a pair of flat plate-like members removably attached by a fixing means to the ends of said pair of finger-support means.

3. A robot hand according to claim 1, further comprising:
    control means for detecting the existence of the workpiece between said pair of fingers, said means for detecting the existence of the workpiece being attached to one of said pair of fingers of said bifinger unit and operatively connected to said means for controlling the operation of said servomotor.

4. A robot hand according to claim 1, wherein said palm means comprises:
    a pair of upper and lower beam plate members combined together to support said finger feed means thereon, said upper beam plate member being provided with a flange plate member by which said robot hand is mounted on a robot wrist of an industrial robot.

5. A robot hand according to claim 4, wherein said upper beam plate member of said palm means is provided with at least one floating mechanism arranged to be intervened between said upper beam plate member and said flange plate member, said floating mechanism being positively broken upon receiving an excess external force or load to therein destroy mechanical connection between said upper beam plate member and said flange plate member wherein transmission of the excess external force or load from said robot hand to said wrist of said industrial robot is prevented.

6. A robot hand according to claim 5, wherein said floating mechanism is provided with a means for detecting breakage of said floating mechanism, said means for detecting breakage of said floating mechanism being operatively connected to said control means for controlling the operation of said servomotor.

7. A robot hand according to claim 1, wherein said finger feed means comprises:
    a pair of feed screw shafts rotated by said servomotor; and
    a pair of nut members integrally accommodated in said pair of finger-support means and threadedly engaged with said pair of feed screw shafts.

8. A robot hand according to claim 7, wherein said pair of feed screw shafts being commonly driven by said single servomotor via a belt-pulley mechanism and a gear mechanism.

9. A robot hand according to claim 1, wherein said finger feed means comprises:

a pair of feed screw shafts rotated by said servomotor, wherein said pair of feed screw shafts being commonly driven by said single servomotor via a belt-pulley mechanism and a gear mechanism; and a pair of nut members integrally accommodated in said pair of finger-support means and threadedly engaged with said pair of feed screw shafts.

10. A method of controlling the operation of a robot hand provided with a bifinger unit having a pair of grasping fingers movable between a relatively closed position for grasping a workpiece and an open position for releasing the workpiece, a feed mechanism for providing said pair of grasping fingers of said bifinger unit with a one-directional feed motion, and a servomotor for driving said feed mechanism, wherein the method comprising the steps of:

determining beforehand data on holding forces applied to various workpieces by said pair of fingers of said bifinger unit in accordance with a weight, a size, a shape, and a surface condition of each of said various workpieces, and storing said data of said holding forces in a memory means;

determining an optimum holding force necessary for grasping an actual workpiece from said data of holding forces stored in said memory means;

determining an optimum output torque from an overall range of torque exerted by said servomotor, in accordance with the optimum holding force necessary for grasping said actual workpiece;

controlling the operation of said servomotor until the optimum output torque corresponding to the optimum holding force is exerted by said servomotor while said pair of fingers of said bifinger unit move to apply a gradually increasing holding force to said actual workpiece; and terminating the movement of said pair of fingers immediately when the output torque exerted by said servomotor attains the optimum output torque during grasping operation of said bifinger unit of said robot hand.

\* \* \* \* \*